Sept. 25, 1928.  
W. K. SHONE  
1,685,297  
BRAKE TESTING MACHINE  
Filed April 19, 1927  
2 Sheets-Sheet 2

INVENTOR  
WESLEY K. SHONE  
BY John Flam  
ATTORNEY

Patented Sept. 25, 1928.

1,685,297

UNITED STATES PATENT OFFICE.

WESLEY K. SHONE, OF LOS ANGELES, CALIFORNIA.

BRAKE-TESTING MACHINE.

Application filed April 19, 1927. Serial No. 184,956.

This invention relates to the testing of brakes, such as are used on automobiles; and more particularly to a scheme that makes it possible to test the braking power of the brakes while the wheels of the automobile are rotated.

Motor vehicles have reached at the present time a high stage of development. Although generally reliable in service, careful check must be kept upon them in order to insure that they may be driven safely. One of the most important factors to be considered in keeping an automobile or motor vehicle in proper condition is the condition of the brakes; for safety they must exert a braking pressure to the wheels not only sufficient to stop the automobile quickly, but they must be uniformly applied, whereby the danger of skidding or the like may be obviated.

Brake testing machines have been proposed in the past, for determining how much torque or power is required to start the rotation of the wheels to which the brakes are applied. However, such machines are either too expensive to be practical, or else they do not adequately exhibit the operation of the brakes under actual service conditions. It is accordingly one of the objects of my invention to provide a simple and inexpensive brake testing machine that is reliable and efficient in operation.

I am able to provide these beneficial results by the aid of a mechanism that directly indicates the torque required to rotate the wheels at varying speed, in which mechanism there is provided a hydraulic transmission system, the fluid pressure therein serving as a criterion for the test. It is accordingly another object of my invention to provide a brake testing mechanism in which the force necessary to rotate the wheels under braking is applied through the medium of a hydraulic cylinder.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawings.

Figure 1:
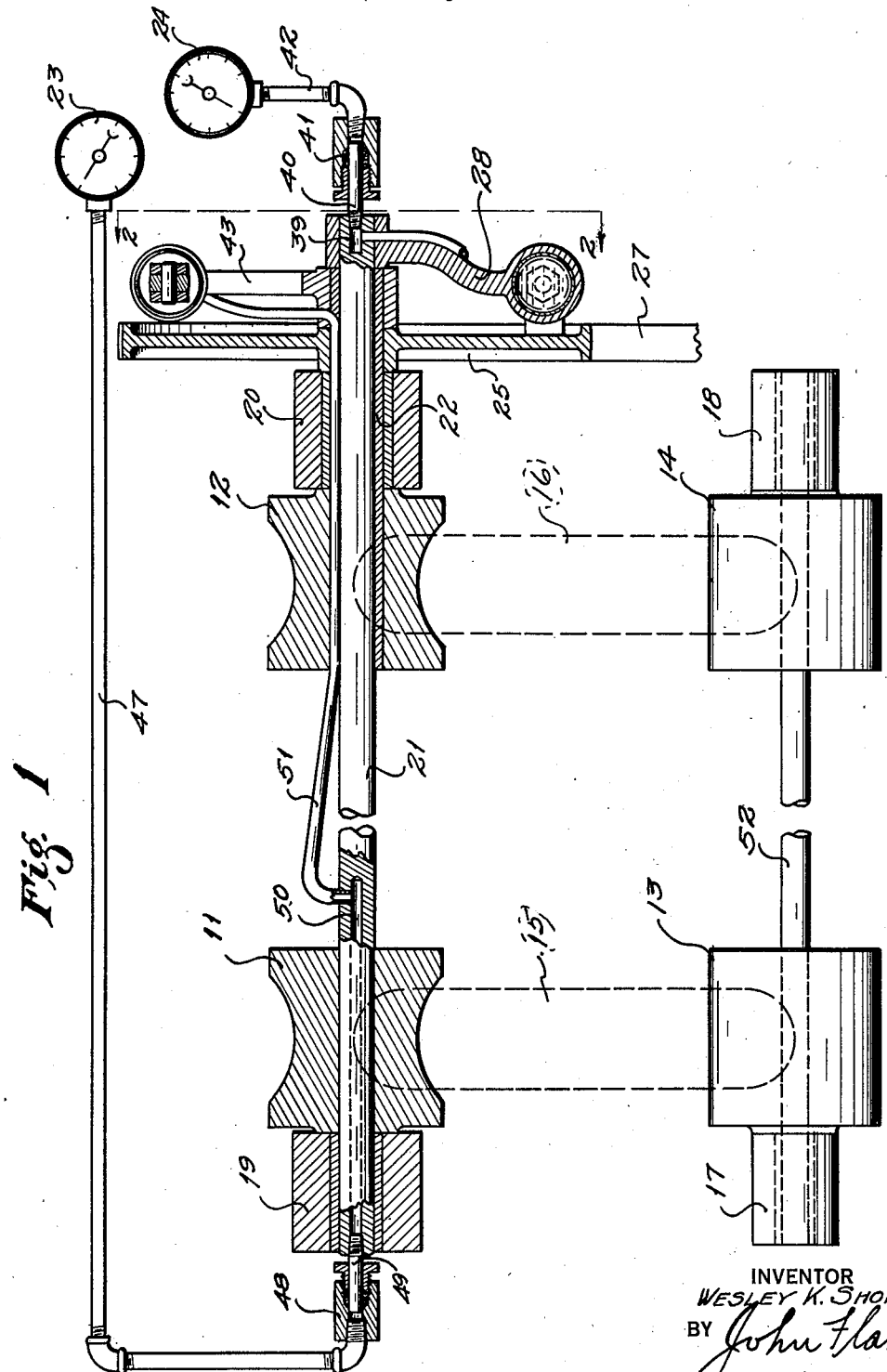
Figure 1 is a view mainly diagrammatic, of a brake testing apparatus incorporating my invention, this view being a sectional view taken along plane 1—1 of Fig. 2.

In Fig. 1, I show a pair of driving rolls 11 and 12, and a pair of idler rolls 13 and 14, mounted on shaft 52, and cooperating with rolls 11 and 12 to form a support for the automobile wheels 15 and 16. These automobile wheels can be either the front wheels of the automobile, or the rear wheels thereof. The driving rolls 11 and 12 serve to impart rotation to the wheels 15 and 16, the automobile being jacked up so as to permit these wheels to be driven without otherwise disturbing the automobile. These rolls 11 and 12 are shown as concave in order to provide a better gripping and driving surface. The idler rolls 13 and 14 simply serve to keep the automobile wheels in elevated position. The shaft 52 on which they are located is rotatably supported in stationary bearings 17 and 18.

When the brakes are applied to wheels 15 and 16, the torque necessary to rotate these wheels 15 and 16 at the same speed indicates the relative braking effect acting upon these wheels. By the aid of my mechanism, it is possible in a simple manner to indicate the relative values of these turning torques. I shall now describe how this is accomplished and the mechanism whereby a measured torque is applied to rolls 11 and 12.

There are a pair of spaced stationary bearing standards 19 and 20, appropriately supported in any desired manner. A long drive shaft 21 is provided, journaled near its left hand end in bearing 19 and carrying adjacent thereto, the driving roller 11, which can be fastened as by keys or the like to the shaft 21. The other driving roller 12 is rigidly fastened to a sleeve 22, that is rotatable with respect to shaft 21 and can be independently rotated. This sleeve has an extension that projects towards the right and which is accommodated in the right hand bearing 20.

By the aid of my invention it is possible to gauge as by fluid pressure, the force that is exerted to turn roller 11, as well as to turn roller 12. For example, the pressure gauges 23 and 24 are so connected as to indicate the relation between the driving torques. How this is accomplished will now be described.

Mounted for relative rotation with respect to sleeve 22, is a wheel 25 which can be driven from any appropriate source of motion, as for example, a pulley 26 (Fig. 2) driving the wheel 25 as by a flexible belt 27. There is a hydraulic link between this wheel and each of the rollers 11 and 12 whereby these rollers are rotated through a fluid pressure device.

At the right hand end of shaft 21 there is fastened thereon an arm 28, in such manner that rotation of the arm will cause rotation of shaft 21. For this purpose, the free end of the arm 28 is arranged to be acted upon by hydraulic mechanism connected to the wheel 25. This mechanism can, for example, comprise a piston and cylinder arrangement shown in greater detail in Fig. 2. In this instance, the cylinder 29 is shown as fastened into a bore in the extremity of arm 28, the axis of the cylinder being at a considerable distance from the axis of shaft 21. Working in the cylinder 29 is a piston 30 having a leather cup washer 31 to provide a tight fit, and held onto a stud 32, as by the aid of metal washer 33 and nut 34. The stud 32 acts as a piston rod and is pivotally connected as by pin 35 to a bracket 36 that is fastened preferably integrally to the wheel 25. The cylinder is filled with some fluid, such as oil.

Figure 2:
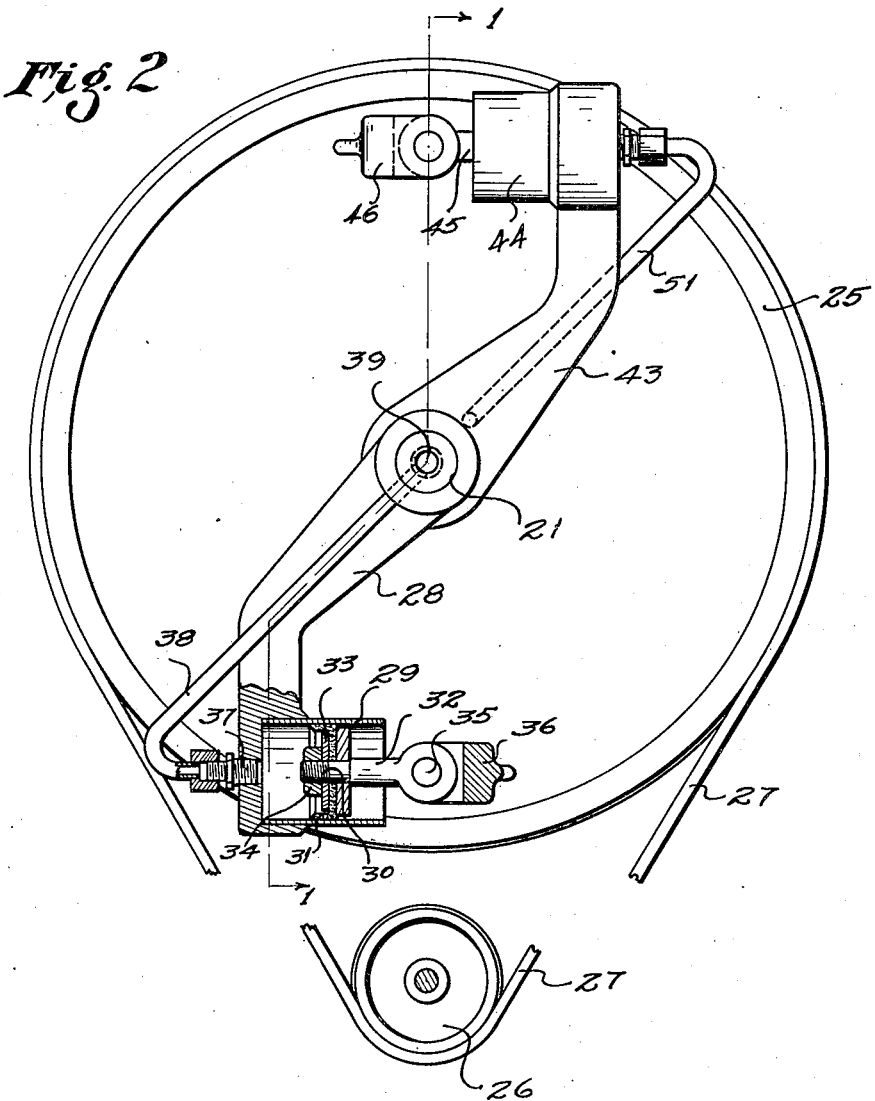
Fig. 2 is a sectional view taken along plane 2—2 of Fig. 1.

As viewed in Fig. 2, it is evident that upon rotation of wheel 25 in a clockwise direction, the piston 30 will advance in the cylinder 29 until the fluid therein will be put under a pressure sufficient to cause movement of arm 28 in a clockwise direction, and corresponding movement of roller 11. The larger the braking force exerted by the brake on wheel 15, the greater this pressure must be, and the farther will the piston 30 travel in cylinder 29 before rotation of wheel 15 is effected. The pressure existing in the fluid medium is a criterion of the braking force exerted by the brake on wheel 15, for this pressure can represent the total fluid pressure on piston 30, and this pressure is exerted at a fixed radius from the axis of shaft 21.

The gauge 24 is so arranged that it responds to the pressure existing in cylinder 29. For this purpose, cylinder 29 has a nipple outlet 37, to which is fastened the pipe connection 38. This connection leads to an axial aperture 39 in shaft 21. A nipple 40 is fastened in this aperture 39 and is rotatable in a packing that is stationary with respect to the mechanism. The pressure gauge 24 is connected as by appropriate piping 42 to the other end of the packing 41. It is evident that if cylinder 29 and the connections 38, 40 and 42 are filled up with a transmitting fluid, such as oil, then the gauge 24 will exhibit the pressure required to be transmitted by the fluid in cylinder 29 to rotate the wheel 15.

In order to compare this value with the pressure corresponding to the torque required to rotate the other wheel 16, a similar piston and cylinder arrangement is provided, interposed between wheels 25 and sleeve 22. Thus, fastened to sleeve 22, is an arm 43, carrying the cylinder 44 in which there is a piston similar to piston 30. This piston has a rod 45 which is pivoted to a stationary bracket 46 on wheel 25.

The pressure connection between gauge 23 and cylinder 44 in this instance is provided by comparatively long pipe 47 (Fig. 1), a stationary packing 48, a nipple 49, screwed into the left hand end of shaft 21, and connecting with the axial aperture 50, and a connection conduit 51 which extends from the aperture 50 through a slot in roller 12 and to the back of cylinder 44. Since the axis of cylinder 44 can be made to be exactly at the same distance from the axis of shaft 21 as the axis of cylinder 29, it is evident that when gauges 23 and 24 indicate the same values, then the braking effect of the brakes on both wheels 15 and 16 is the same, and the brakes are properly alined.

It is evident that the speed of the driving wheel 25 can be varied, as well as the braking intensity, to determine whether the brakes are in alinement for a considerable range of speed and degree of braking. It is necessary merely to note the relative readings of gauges 23 and 24. The individual brakes can in fact, be adjusted while the apparatus is in operation, and until the gauges read alike.

Figure 3:
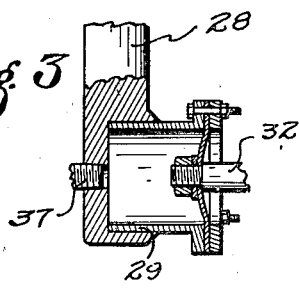
Fig. 3 is a fragmentary view of a possible modification.

The principle of utilizing hydraulic transmission to move the braked wheels 15 and 16 thus result in a considerable simplification of the job of alining the brakes. Modifications of the form of hydraulic transmission shown could readily be suggested. For example, one possible modification would be the elimination of the piston 30 and the substitution of a diaphragm therefor. Such a modification is illustrated diagrammatically in Fig. 3.

I claim:

1. In a brake testing apparatus, a roll for imparting motion to a wheel, a shaft to which the roll is fastened, an arm fastened to the shaft, a rotatable driving wheel having an axis coincident with that of the shaft, a fluid pressure cylinder having its axis at an angle to that of the shaft and at a distance from the axis of the shaft, said cylinder connecting the arm and the driving wheel whereby rotation of the wheel will cause the fluid in the cylinder to be compressed and to exert a torque upon the arm, a conduit connecting the cylinder with an axial bore in the shaft, a tube fastened in the bore, a stationary packing in which the tube rotates as the shaft is driven, and a pressure responsive indicator connected to the packing chamber.

2. In a brake testing machine, a shaft, a roll fastened to the shaft, a sleeve rotatable with respect to the shaft and disposed thereover, another roll fastened to the sleeve, a driving wheel mounted coaxially with the shaft and sleeve, a pair of arms, one connected to the shaft, and the other to the sleeve, a pressure cylinder for connecting each arm to the wheel whereby rotation of the wheel will cause fluid pressure to be exerted in the cylinders to drive the arms, and indicating means for each cylinder responsive to the pressure therein.

In testimony whereof I have hereunto set my hand.

WESLEY K. SHONE.